Sept. 28, 1954 L. D. SACRE 2,690,022
PROJECTION AND VIEWING FILM MOUNT
Filed June 28, 1950 2 Sheets-Sheet 1
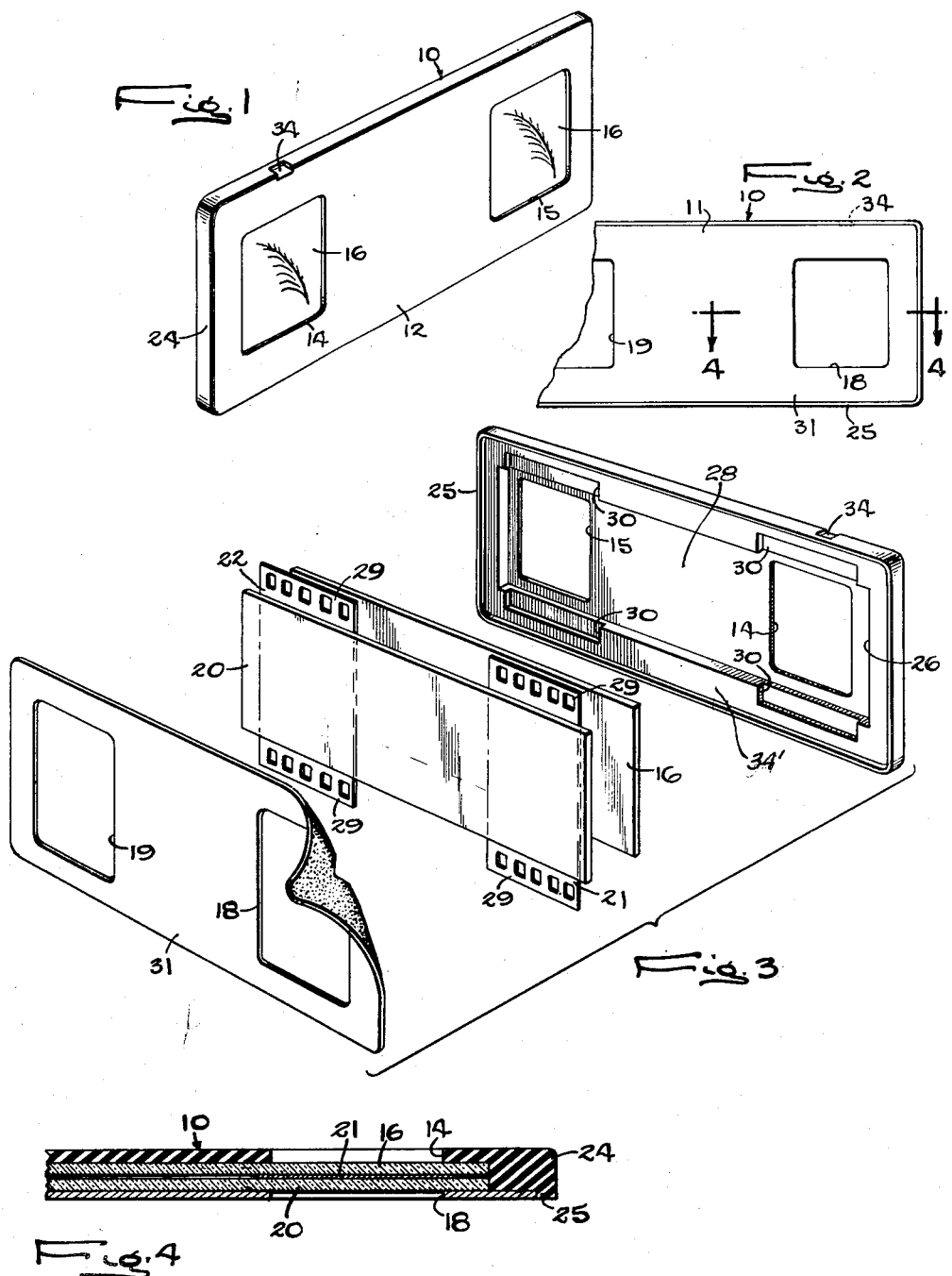
INVENTOR
Leo D. Sacre
Carlson, Pitzner, Hubbard + Wolf
ATTORNEYS Sept. 28, 1954 L. D. SACRE 2,690,022
PROJECTION AND VIEWING FILM MOUNT
Filed June 28, 1950 2 Sheets-Sheet 2
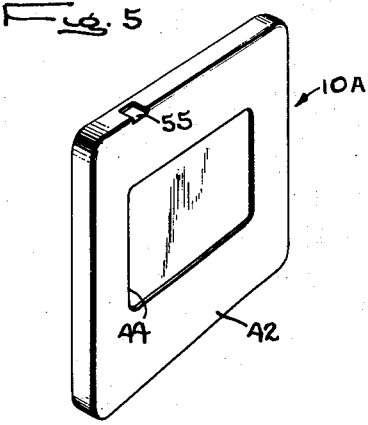
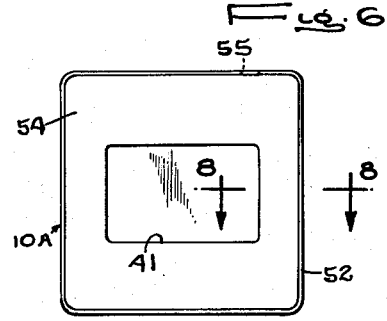
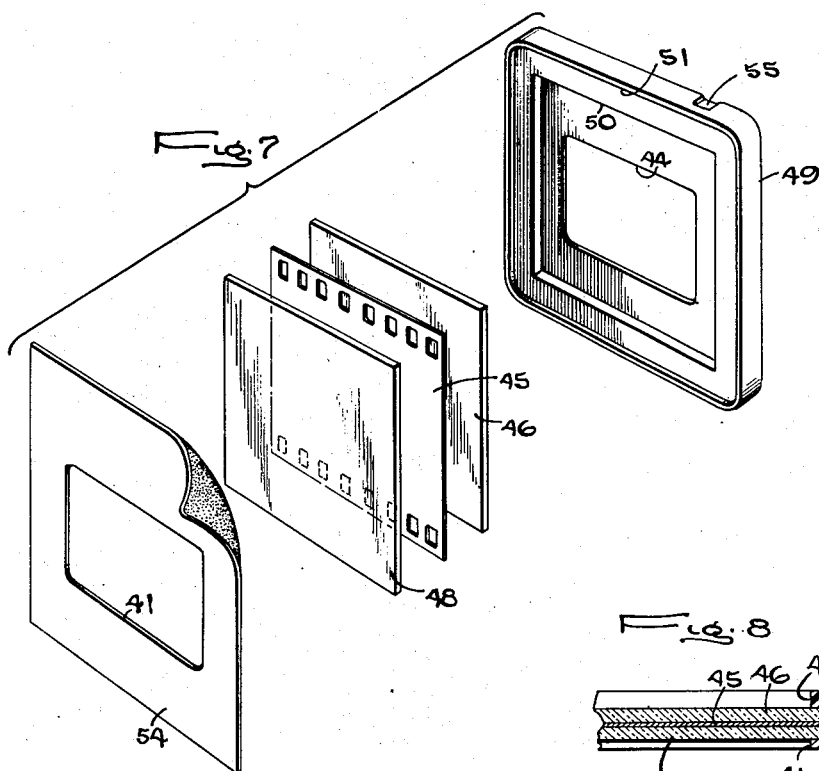
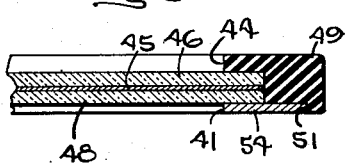
INVENTOR
Leo D. Sacre
Carlson, Pitzner, Hubbard & Wolfe
ATTORNEYS Patented Sept. 28, 1954

2,690,022

UNITED STATES PATENT OFFICE 2,690,022

PROJECTION AND VIEWING FILM MOUNT

Leo Dean Sacre, Indianola, Iowa

Application June 28, 1950, Serial No. 170,851

3 Claims. (Cl. 40—159)

The present invention pertains generally to photographic equipment and more specifically to a novel film mount for lantern slides, such mount being susceptible of use with either a projector or an individual viewer.

Heretofore, conventional lantern slides for both two-dimensional and three-dimensional projection have been of two general types, namely, cardboard and glass. Of these two, the cardboard slide is by far the most economical and merely comprises a pair of die-cut paper or cardboard masks which sandwich therebetween a single film or a pair of films in registration with appropriate window apertures. The masks may be fastened together in various ways and may possibly be bound along one or more edges. Such an assembly provides little protection for the film and is highly unsatisfactory for use in a projector where it is exposed to considerable heat from the projector light source.

In the conventional glass slide construction, a single sheet of heavy paper stock with one or two die-cut window openings is provided, the film being painstakingly mounted thereon as by means of cement or acetate tape and in registration with such aperture or apertures. This subassembly is thereupon sandwiched between a pair of glass panels or plates coextensive in area therewith and the parts are maintained in assembled relation by the use of an edge binding which is usually some sort of adhesive tape. Such construction is unduly expensive due to the fact that it requires highly skilled labor and necessitates the use of various jigs and fixtures for obtaining proper positioning and registration of the film. The quality of the finished product is often disproportionate to the expense of producing it since variations in the length and width of the glass panels can easily result in cocking of the pictures produced by the projector or viewer regardless of how carefully the film might have been originally mounted upon the paper sheet between the glass. Moreover, variations in the manner of applying the binding tape are also capable of creating this undesirable condition.

Accordingly, one object of the present invention is to provide a precision film mount of the glass or transparent window type and which may readily be assembled by relatively unskilled labor or a rank amateur.

Another object is to provide a film mount of the character set forth which will be particularly well adapted for use with projectors but which will also be capable of satisfactory performance when used in a viewer.

A further object is to provide a film mount of the above type and which will be susceptible of economical manufacture on a mass productive basis at costs substantially below those required for conventional glass slides.

Other objects and advantages will become apparent as the following detailed description proceeds, taken in the light of the accompanying drawings, wherein:

Figure 1 is a perspective view of an illustrative film mount embodying the present invention, such mount being of the type adapted for three-dimensional projection or viewing.

Fig. 2 is a face view of the film mount of Fig. 1 but shows the opposite side thereof.

Fig. 3 is an exploded perspective view detailing the component parts of the illustrative mount of Fig. 1 and showing such parts in assembled but spaced apart relation to each other.

Fig. 4 is an enlarged fragmentary sectional view through the mount of Fig. 1, such view being taken in the plane of the line 4—4 in Fig. 2.

Fig. 5 is a perspective view generally similar to Fig. 1 but showing a modified film mount also embodying the invention, such mount being adapted for two-dimensional projection or viewing.

Fig. 6 is a face view of the modified mount shown in Fig. 5 but illustrating the opposite side face thereof.

Fig. 7 is an exploded perspective view of the mount of Figs. 5 and 6 showing the parts in assembled but spaced apart relation with each other.

Fig. 8 is an enlarged fragmentary sectional view through the mount of Fig. 6, such view being taken in the plane of the line 8—8.

While the invention is suceptible of various modifications and alternative constructions, certain preferred embodiments have been shown in the drawings and will be described below in considerable detail. It should be understood, however, that there is no intention to limit the invention to the specific forms disclosed, but on the contrary, the intention is to cover all modifications and alternative constructions falling within the spirit and scope of the invention as expressed in the appended claims.

Referring more specifically to Figs. 1 and 2, there is shown an illustrative film mount 10 embodying the present invention and adapted for three-dimensional or stereoscopic projection or viewing. The mount 10 happens to be fashioned substantially in the shape of a rectangular wafer, having opposed side faces 11 and 12. When used in a projector, the face 11, which can be termed the front face, is located adjacent the light source of the projector while the face 12, which can be termed the rear face, is located remotely therefrom. Window apertures 14 and 15 are located in laterally spaced, horizontally alined relation in the rear face of the mount 10, exposing portions of transparent window panel 16 of glass or the like. In the front face of the mount 10, window apertures 18, 19 are provided, being located in registration with the apertures 14, 15, respectively, and exposing portions of transparent window panel 20 of glass or the like. Sandwiched between the window panels 16, 20 are a right film 21, adapted to define a right eye image, and a left film 22, adapted to define a left eye image. Means is provided for precisely mounting the right and left films 21, 22 in predetermined positions within the mount 10 as an incident to assembly of the same and without the use of jigs, fixtures, or special tools. Since the illustrative film mount 10 happens to be adapted for three-dimensional projection or viewing, this means that the films 21, 22 must be positioned with their vertical axes in laterally spaced parallel relation and their horizontal axes coincident and parallel to the horizontal or longer edges of the mount 10. The foregoing is accomplished through the use of a holding mask or body 24 having opposed side faces and a thickness equal to that of the finished mount 10. One of the body side faces defines the rear face 12 of the mount 10, while the opposite body side face is provided with a plurality of overlapping locating recesses surrounded by a relatively narrow peripheral skirt 25. Referring more specifically to Fig. 3, it will be perceived that the body 24 is fashioned with an elongate recess 26 of appropriate size to accommodate the transparent window panels 16, 20 with a single thickness of film sandwiched therebetween. The floor of the recess 26 defines within the body 24 and opaque masking wall 28 which marginally surrounds the window apertures 14, 15. To facilitate positioning of the films 21, 22 within the mount 10, the vertical dimensions of the panels 16, 20 and the recess 26 are substantially less than the vertical dimensions of the films 21, 22. This leaves sprocket margins 29 of the films available for locating purposes. Accordingly, the upper and lower walls of the panel recess 26 are notched out in the vicinity of each window aperture to define a pair of precisely dimensioned, identical film recesses 30 each of suitable size to comfortably receive a sprocket margin of one of the films 21, 22. Each pair of the recesses 30 is disposed in vertically alined and centered relation with the window aperture adjacent thereto. In addition, the recesses 30 above and below the window apertures, respectively, are disposed in horizontal alinement. Consequently, the recesses 30 are well adapted to orient the films 21, 22 in proper relation to each other as well as to the exterior dimensions of the mount 10.

With the construction thus far described, the window panels 16, 20 and their associated films 21, 22 may readily be positioned within the mount 10 by the simple step of being inserted into their corresponding recesses 26, 30. In order to secure these parts in properly assembled relation, there is provided a sealing mask 31 almost coextensive in area with the front face 11 of the mount 10, the window apertures 18, 19 being die- cut therein. To receive the mask 31, the body 24 is provided with a relatively shallow recess 32 defined by the peripheral skirt 25. The floor of the recess 32 includes a sealing shelf 34' which surrounds the window panel and film recesses 26, 30. The mask 31 may be secured to the body 24 as by means of an adhesive layer interposed therebetween. Preferably, the surface of the mask 31 abutting the body 24 is initially coated with adhesive material which may be of any appropriate type. When installed in place, the outer face of the mask 31 is coplanar with the edge of the peripheral skirt 25 which effectively protects its edges.

By the use of the construction just described, it will be appreciated that the transparent window panels 16, 20 may be much smaller in area than those used in conventional glass slides. Moreover, dimensional variations in the transparent panels 16, 20 are inconsequential as long as such panels are of sufficient dimension to create a marginal overlap with respect to the window apertures in the body 24 and in the sealing mask 31. By the same token, the film recesses 30 and the films 21, 22 can easily be held to precise dimensions, making it possible for a relatively unskilled person or an amateur to assemble the mount 10 and create a perfect finished product.

In the practice of the invention, it has been found possible to utilize relatively inexpensive thermoplastic material such as a polystyrene resin for the holding mask or body 24, notwithstanding the fact that when used in a projector the mount 10 is exposed to rather intense heat from the projector light source. This is accomplished in a remarkably simple and effective manner by providing the sealing mask 31 with an outer surface having relatively high heat reflective properties. A wide variety of materials may be used for the sealing mask 31 including metallic foil or metallic foil coatings. However, it has been found highly satisfactory and more economical to utilize a high grade light colored paper for this purpose. With its dimensional stability thus protected, the body 24 may readily be fashioned as an integral unit as by means of an injection molding process. This technique readily lends itself to the manufacture of such articles on a mass productive basis and at extremely low cost.

In three-dimensional projection, it is highly important that the picture on the right film, which defines the right eye image, and the picture on the left film, which defines the left eye image, be projected on the screen in that orientation. For this reason, and also for purposes of convenient presentation, it is highly important that an operator have some ready means of identifying the orientation of a film mount as he prepares to insert it into a projector or viewer. Accordingly, there is provided on the mount 10 appropriate indexing means capable of apprising the operator through sense of touch alone as to the orientation of the mount 10. In the present instance, this is achieved through the simple expedient of forming a relatively small indexing notch 34 along one of the edges of the body 24. In the illustrative mount 10, the notch 34 happens to be located along the top edge of the body (as shown in the drawings) and in overlying relation with the right window aperture 14.

Turning now to Figs. 5 to 8, inclusive, there is shown a modified film mount 10A also embodying the invention but adapted only for two-dimensional projection or viewing. The mount 10A more nearly approximates a square in shape and comprises a front face 40 having a window aperture 41 therein, together with a rear face 42 having an alined window aperture 44 therein. The mount 10A is adapted to house a single piece of film 45 which is disposed in sandwiched relation between a rear transparent window panel 46 and a front transparent window panel 48, the film and transparent panels in this instance being substantially coextensive in area. Referring more specifically to Fig. 7, it will be perceived that the mount 10A comprises a holding mask or body 49 having formed in one of its side faces a film and window panel recess 50 together with a sealing mask recess 51. Both of these recesses are concentric with respect to each other and to the window aperture 44 in the body 49, the recess 51 being relatively shallow and thereby defining a peripheral skirt 52 around the edge of the body. In this instance, the recess 50 is of appropriate size to receive window panels 46, 48, together with the film 45, and at the same time to precisely position the latter. To allow for a certain amount of dimensional variation of the panels 46, 48, the overall dimensions of the latter are preferably slightly less than those of the film 45. These parts when assembled within the recess 50 are secured in place effectively by means of a heat reflective sealing mask 54 which generally resembles the mask 31 of the mount 10 and is adhesively secured to the body 49. When the mask 54 is in place, the peripheral skirt 52 protects its edges and precludes the accidental loosening thereof. Like the mount 10, the mount 10A is also provided with an indexing means in the form of a notch 55 in one of its edges. Similarly, the body 49 may be fabricated as by injection molding from thermoplastic material, its dimensional stability being adequately protected against possible heat distortion by reason of the heat reflective properties of the sealing mask 54.

I claim as my invention:

1. As an article of manufacture, a three-dimensional projection and viewing film mount comprising the combination of a generally rectangular body having a pair of laterally spaced window apertures therein together with a plurality of recesses in one side face thereof including an elongated recess extending along a lengthwise axis and a pair of axially spaced transverse recesses each extending transversely beyond said elongated recess, a pair of transparent window panels housed within said elongated recess, said panels being adapted to sandwich therebetween two spaced film sections with the margins thereof disposed in registry with respective ones of said pair of spaced recesses, and a sealing mask having a pair of window apertures, said sealing mask being susceptible of being adhesively secured to said body with its window apertures in registration with those of said body.

2. As a new article of manufacture, a three-dimensional projection and viewing film mount, comprising, in combination, an integral holding mask fashioned substantially in the shape of a rectangular wafer, said holding mask having a pair of laterally spaced window apertures located upon an axis parallel with the longer edges thereof, one of the side faces of said holding mask having a laterally elongated panel-receiving recess therein defining a masking wall which marginally surrounds said window apertures, said one side face also having film locating recesses therein disposed in vertically alined pairs each centered in relation to a respective one of the window apertures, the film recesses respectively above and below said window apertures being horizontally alined, a pair of glass window panels nestingly disposable within the panel recesses, said panels being of appropriate size to sandwich therebetween a right film and a left film having marginal portions projecting respectively into said pairs of film locating recesses, a peripheral skirt defining a relatively large shallow recess in said one side face, an adhesive coated sealing mask nestingly disposable within said shallow recess, said sealing mask having window apertures susceptible of registration with the window apertures in said holding mask, said sealing mask also having a surface with relatively high heat reflecting properties.

3. In a three-dimensional projection and viewing film mount of the character set forth, an integral holding mask of substantially flat rectangular shape, said holding mask having a pair of laterally spaced window apertures located upon an axis parallel with the longer edges thereof, one of the side faces of said holding mask having a laterally elongated panel-receiving recess therein defining a masking wall which marginally surrounds said window apertures, said one side face also having film locating recesses therein disposed in vertically alined pairs each centered in relation to a respective one of the window apertures, the film recesses respectively above and below said window apertures being horizontally alined, and a peripheral skirt defining a relatively large shallow recess in said one side face.

References Cited in the file of this patent

UNITED STATES PATENTS

| Number | Name | Date |
| --- | --- | --- |
| 2,153,149 | MacHarg | Apr. 4, 1939 |
| 2,165,790 | Engel | July 11, 1939 |
| 2,268,529 | Stiles | Dec. 30, 1941 |
| 2,292,312 | Wittel | Aug. 4, 1942 |
| 2,330,292 | Knight | Sept. 28, 1943 |
| 2,362,434 | Fitch | Nov. 7, 1944 |
| 2,401,241 | Grobholz | May 28, 1946 |
| 2,527,765 | Roehrl | Oct. 31, 1950 |
| 2,533,474 | Koch | Dec. 12, 1950 |
| 2,571,764 | Rodger | Oct. 16, 1951 |
| 2,599,382 | Goldberg | June 3, 1952 |